(12) United States Patent
Liang-Tang

(10) Patent No.: US 7,230,889 B2
(45) Date of Patent: Jun. 12, 2007

(54) STARTUP PROCEDURE OF OPTICAL DRIVE AFTER RECORDING OR ERASING ON OPTICAL DISC

(75) Inventor: Huang Liang-Tang, Taipei (TW)

(73) Assignee: Lite-on IT Corporation, Taipei (TW)

( * ) Notice: Subject to any disclaimer, the term of this patent is extended or adjusted under 35 U.S.C. 154(b) by 552 days.

(21) Appl. No.: 10/736,433

(22) Filed: Dec. 15, 2003

(65) Prior Publication Data

US 2004/0125709 A1    Jul. 1, 2004

(30) Foreign Application Priority Data

Dec. 17, 2002  (TW) .............................. 91136442 A

(51) Int. Cl.
*G11B 7/00* (2006.01)
(52) U.S. Cl. ............................... 369/44.27; 369/53.45; 369/47.55

(58) Field of Classification Search ................... None
See application file for complete search history.

(56) References Cited

U.S. PATENT DOCUMENTS 6,137,751 A * 10/2000 Kim ...................... 369/30.36
7,102,968 B2 * 9/2006 Steenbergen ............ 369/47.21

* cited by examiner

*Primary Examiner*—Muhammad Edun
(74) *Attorney, Agent, or Firm*—Thomas, Kayden, Horstemeyer & Risley

(57) ABSTRACT

The present invention discloses a startup procedure of optical drive after recording or erasing on an optical disc. After disc writing, startup procedure begins, a chipset reads the recorded data on the disc directly using the track information and focus servo parameter in the memory. Thus, the invention reduces time spent in the reading procedure.

16 Claims, 3 Drawing Sheets

STARTUP PROCEDURE OF OPTICAL DRIVE AFTER RECORDING OR ERASING ON OPTICAL DISC

BACKGROUND OF THE INVENTION

1. Field of the Invention

The present invention relates to a startup procedure, and in particular to a startup procedure for reading a disc without updating the focus servo parameter and the track information in the memory.

2. Description of the Related Art

Generally speaking, conventional optical discs can be CD-ROM, CD-R or CD-RW. Since CD-ROM is the oldest format, data storage therein is slightly different from CD-R and CD-RW.

Referring to FIG. 1a and FIG. 1b, storage format of a conventional CD-ROM is shown. In general, Spiral track of disc 100 is distributed outward from the inner circle. As shown in FIG. 1b, the track of a disc is represented as a straight line. Data distribution can be divided into lead-in zone 102, data zone 104 and lead-out zone 106. These three zones form a session 110, wherein lead-in zone 102 is located in the inner circle of the spiral track, and lead-out zone 106 is located in the outer circle of the spiral track. Between the lead-in zone 102 and the lead-out zone 106 is data zone 104. Conventional CD-ROM discs support multi-session format, within which another session 120, comprising lead-in zone 112, data zone 114 and lead-out zone 116, can be stored on the same conventional disc.

In general, table of contents, herein TOC, in the lead-in zone stores the start addresses of the data on each track of the data zone. Therefore, the optical pick up head must be moved to TOC to retrieve the start addresses of the data in each track in advance so that it can retrieve data from the data zone.

As shown in FIG. 2, the spiral track of a conventional CD-R or CD-RW is represented in a straight line. An additional program memory area 200, hereafter referred to as the PMA 200, is in the area of the innermost circle in CD-R or CD-RW unlike the format of CD-ROM. In addition to TOC, other related information of the data zone is included in the PMA, for example, the end addresses of each track, and others. Thus, the data distribution of conventional CD-R and CD-RW is PMA 200 in the innermost circle, followed by session 210, up to session 220. Each session comprises a lead-in zone, data zone and lead-out zone. For example, session 210 comprises lead-in zone 212, data zone 214, lead-out zone 216, and session 220 comprises lead-in zone 222, data zone 224 and lead-out zone 226. In order to support the CD-ROM, TOC is included in the lead-in zone.

In general, there are several writing modes in which CD burners record CD-R or CD-RW.

Track at once, hereafter referred to as TAO, is a recording scheme in which, for each writing, the data of only one track is written in the data zone, information relating to the written data is saved in PMA, and the start addresses of all tracks are recorded in TOC in order to be compatible with the CD-ROM format.

Session at once, hereafter referred to as the SAO, is a recording scheme in which, for each writing, all the data of a session is written in a disc, i.e. lead-in zone, data zone and lead-out zone are written. As well, all the information of the session is written into PMA, and the TOC of the lead-in zone is, naturally, written commensurate with entire session.

Due to the ongoing advances of recording technique, the recording speed of CD burners has achieved 52× speed, taking as little as 2 minutes to record a CD-R or CD-RW, compared to previous CD burners with average recording times of 10 minutes.

When recording in the SAO scheme, the chipset of the CD burner must control a memory (usually a dynamic random access memory, DRAM) to store all track information including all information of the TOC and PMA. Therefore, during writing, the chipset acquires and reassembles the corresponding information when data is recording on the disc before writing it to TOC or PMA. After the disc writing procedure is finished, all information related to the PMA of the disc can be acquired from the memory and then write on the PMA of disc.

Generally, the recording operation includes writing and reading procedures. In a SAO scheme for example, writing procedure takes place when the PMA and all sessions are written unto a disc, and then reading procedure immediately follows.

In conventional recording operations, a startup procedure should be performed firstly at the beginning of reading procedure. At the same time, the disc is re-rotated, and the CD burner performs servo focus parameter searching again for storing the focus servo parameter in the memory. Next, track information is re-read again within the PMA and TOC and then memory-is updated by the chipset with the read track information. Then, the CD burner retrieves the recorded data in data zone using the track information.

The reading procedure of the CD burner is then finished. The Startup procedure, however, includes rotating the disc, searching servo focus parameter, and reading track information, each of which requires about 10 to 30 seconds. In a conventional CD burner with very low burning speed, time required by the startup procedure is much shorter than the total time required by writing procedure. It is not necessary to consider the wasting time of the startup procedure. However, in modern CD burner, it seems waste of time in startup procedure because of the short time spent in writing procedure. Hence, it is necessary to save time required by startup procedure for reading procedure.

SUMMARY OF THE INVENTION

Accordingly, an object of the invention is to provide a method for the chipset of CD burner to reduce restart time after finishing the writing procedure. After the writing procedure of CD burner is finished, the chipset directly starts the CD burner in accordance with the track information and the focus servo parameter in the memory, thus saving time of restart.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The invention provides a method to decrease startup time after writing, as follows:

First, a disc is recorded according to any one of the writing modes, such as SAO. The acquired focus servo parameter is searched and stored in the memory; the track information is also stored in the memory during writing procedure. In the reading procedure, startup procedure is firstly performed. In the startup procedure, the focus servo parameter and the track information from the memory is used, and then data on the disc is retrieved by using the tracking information stored in the memory.

Figure 1A:
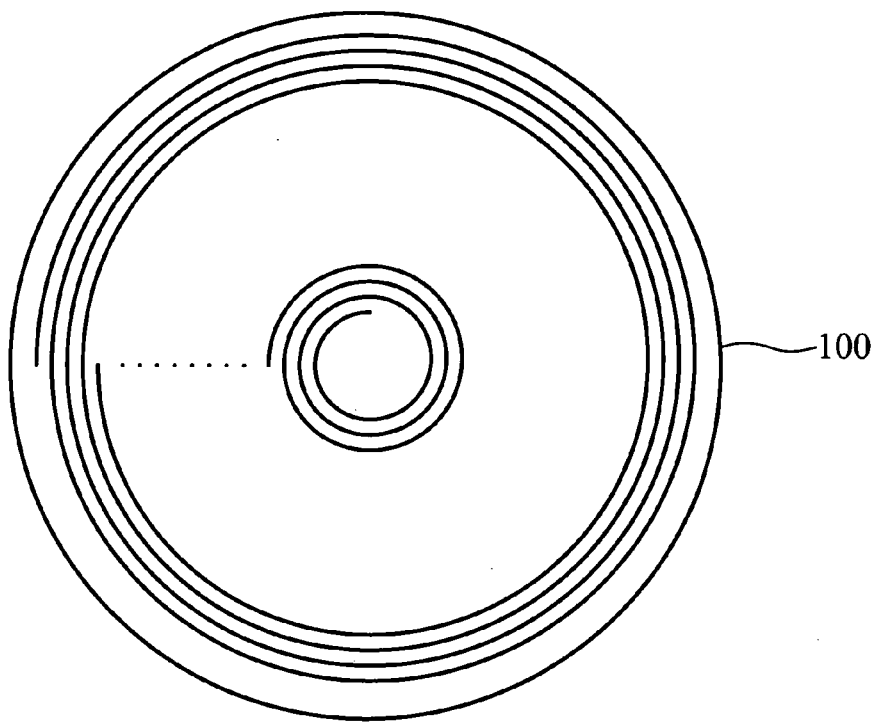
FIGS. 1a and 1b show the data storage format of a conventional CD-ROM disc.
Figure 1B:
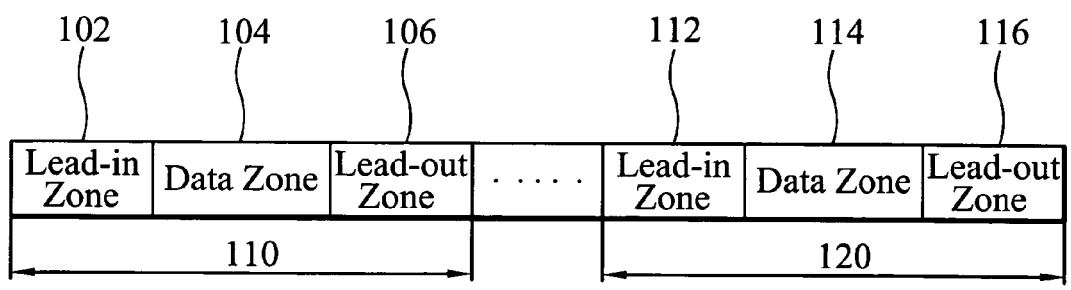
Figure 2:
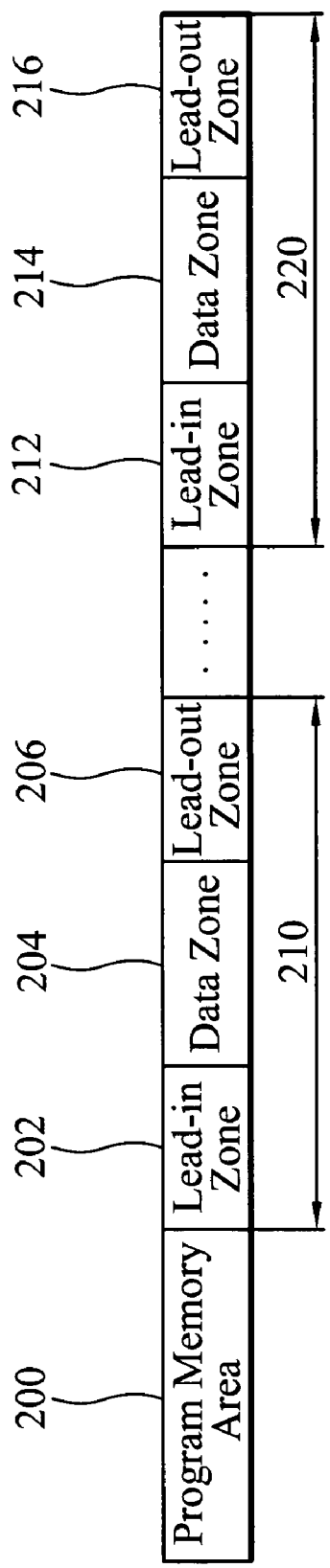
FIG. 2 shows the spiral track of a conventional CD-R or CD-RW represented as a straight line.
Figure 3:
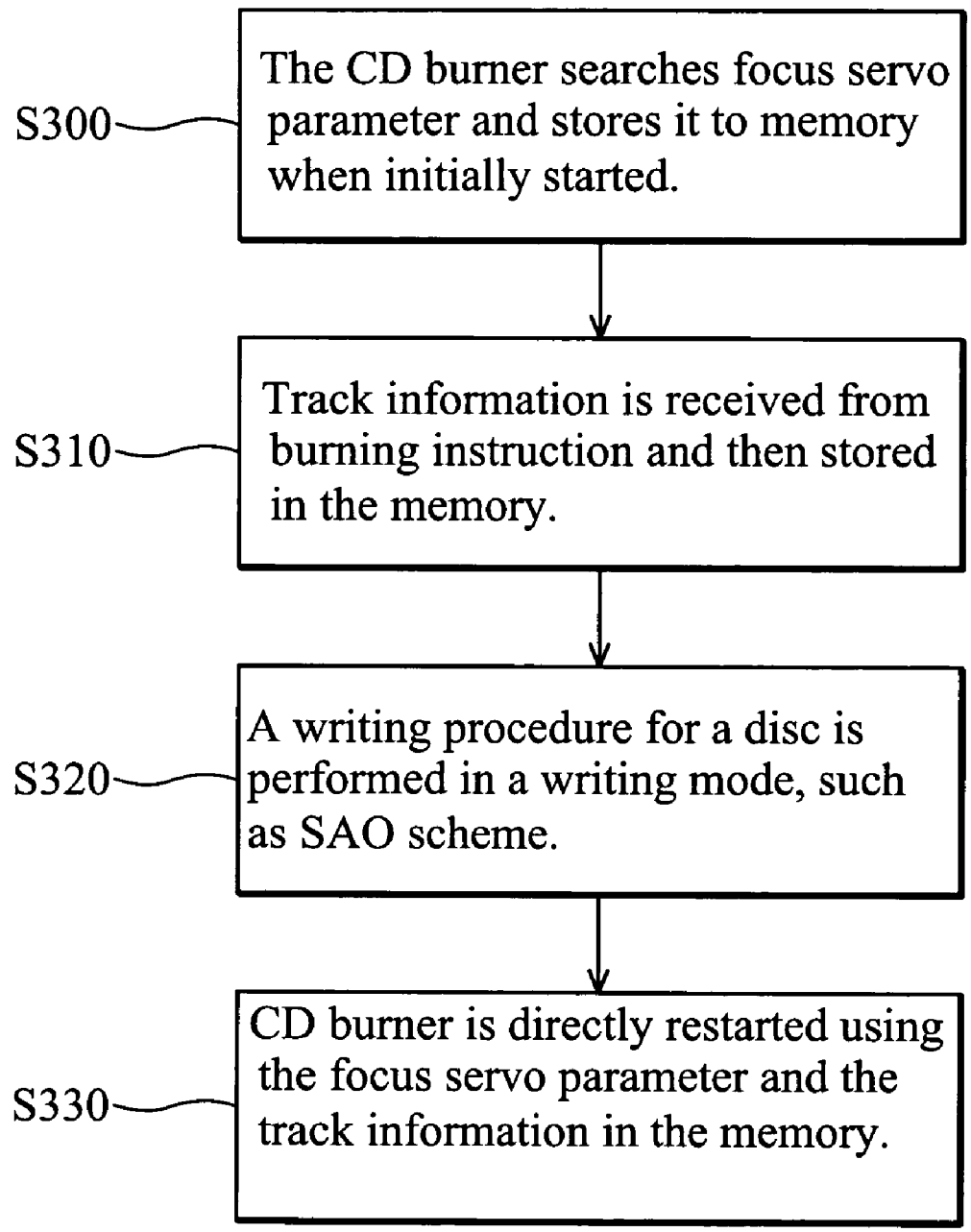
FIG. 3 is a flowchart showing the startup procedure in the invention.

FIG. 3 is a flowchart of the method of this invention to reduce restart time after writing.

Before writing, the CD burner must perform focus servo parameter searching on the disc to obtain a focus servo parameter and carry out the entire disc writing procedure in accordance with the obtained focus servo parameter. The CD burner then stores the focus servo parameter it to memory when initially started (Step S300).

Next, a host issues burning instruction and recording data. Track information is received and then stored in the memory (Step S310). Disc writing procedure is started in accordance with the recording data, track information and a writing mode, the SAO scheme in this embodiment, provided by the host. Then the disc is burned in SAO scheme (Step S320);

If problems such as burn errors occur, a write error signal is issued, and recording fails. When the CD burner burns the disc successfully, there is no write error signal, and the focus servo parameter and the track information used by CD burner recording a disc are correct. That is to say, when CD burner finishes disc writing procedure successfully, the focus servo parameter and track information in the memory controlled by the chipset within CD burner are correct.

Therefore, the focus servo parameter and track information in the memory can be directly used in the startup procedure. There is no need to update memory by searching focus parameter and tracking information. The CD burner can perform the following reading procedure directly using the focus servo parameter and the track information in the memory (Step S330).

Thus the steps to re-acquire the focus servo parameter and re-read track information are completely skipped when the CD burner is in reading procedure. Thus, time wasted in startup procedure is saved.

In the invention, all data (focus servo parameter and track information) in the memory is used to directly restart CD burner after burning, so that time is reduced.

Furthermore, the invention can also be used to erase the CD-RW. When the data is erased, the focus servo parameter and track information must be also stored in the memory. In the erasing procedure, a specific pattern is fully written on the disc. After erasing, the CD burner can be directly restarted using all data in the memory to check whether all data on the disk is erased (instead of the specific pattern) or not.

When the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of reducing time of startup procedure for used in a disc recorder, comprising the steps of:
    searching a focus servo parameter and storing the focus servo parameter in a memory;
    receiving track information from a host and storing the track information in the memory;
    performing a writing procedure for writing data on a disc according to the focus servo parameter, the track information and a writing mode from the host; and
    starting up the disc recorder in a reading procedure using the focus servo parameter and the track information stored in the memory.

2. The method as claimed in claim 1, wherein the memory is controlled by a chipset.

3. The method as claimed in claim 1, wherein the memory is a dynamic random access memory.

4. The method as claimed in claim 1, wherein the disc is a recordable compact disc.

5. The method as claimed in claim 1, wherein the disc is a rewritable compact disc.

6. The method as claimed in claim 1, wherein storage of the focus servo parameter and the track information into the memory is performed by a chip of the disc recorder.

7. The method as claimed in claim 1, wherein the writing mode is a session-at-once (SAO) scheme.

8. The method as claimed in claim 1, wherein the disc recorder is a compact disc recorder.

9. A method of reducing time of startup procedure for used in a disc recorder, comprising the steps of:
    searching a focus servo parameter and storing the focus servo parameter in a memory;
    performing a writing procedure for writing a specific pattern on a disc according to the focus servo parameter;
    Storing a track information in the memory the during writing procedure; and
    starting up the disc recorder in a reading procedure using the focus servo parameter and the track information stored in the memory.

10. The method as claimed in claim 9, wherein the memory is controlled by a chipset.

11. The method as claimed in claim 9, wherein the memory is a dynamic random access memory.

12. The method as claimed in claim 9, wherein the disc is a recordable compact disc.

13. The method as claimed in claim 9, wherein the disc is a rewritable compact disc.

14. The method as claimed in claim 9, wherein storage of the focus servo parameter and the track information into the memory is performed by a chip of the disc recorder.

15. The method as claimed in claim 9, wherein the writing mode is a session-at-once (SAO) scheme.

16. The method as claimed in claim 9, wherein the disc recorder is a compact disc recorder.

* * * * *